(12) United States Patent
Zises

(10) Patent No.: US 8,995,640 B2
(45) Date of Patent: Mar. 31, 2015

(54) CALL FORWARDING INITIATION SYSTEM AND METHOD

(71) Applicant: Matthew Scott Zises, San Jose, CA (US)

(72) Inventor: Matthew Scott Zises, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/706,899

(22) Filed: Dec. 6, 2012

(65) Prior Publication Data

US 2014/0161245 A1 Jun. 12, 2014

(51) Int. Cl.
*H04M 3/42* (2006.01)
*H04M 3/54* (2006.01)
*G01M 11/00* (2006.01)
*H04M 1/24* (2006.01)

(52) U.S. Cl.
CPC .............. *H04M 3/54* (2013.01); *G01M 11/30* (2013.01); *H04M 1/24* (2013.01)
USPC ..................................... 379/211.02; 455/417

(58) Field of Classification Search
CPC ............... H04M 3/42059; H04M 3/42068; H04M 3/42076; H04M 3/42102; H04M 3/42229; H04M 3/54; H04M 3/58; H04M 1/006; H04M 2203/1091; H04M 2207/18; H04W 4/16; G01C 21/36
USPC ............ 379/211.01, 211.02, 212.01; 455/417
See application file for complete search history.

(56) References Cited

U.S. PATENT DOCUMENTS

| | | | | |
|---|---|---|---|---|
| 6,175,741 | B1 * | 1/2001 | Alperovich | 455/458 |
| 2004/0248563 | A1 * | 12/2004 | Ayers et al. | 455/417 |
| 2007/0296739 | A1 * | 12/2007 | Lonn | 345/634 |
| 2009/0172527 | A1 * | 7/2009 | Buecker et al. | 715/700 |
| 2012/0130704 | A1 * | 5/2012 | Lee et al. | 704/3 |

* cited by examiner

*Primary Examiner* — Antim Shah
(74) *Attorney, Agent, or Firm* — Schwegman Lundberg & Woessner, P.A.

(57) ABSTRACT

A method and system creates on a portable electronic device a real-time graphical view of an in-store product display that pinpoints the location of one or more target products on the product display. The graphical view is generated by capturing image data, such as a video feed of the in-store product display, and processing the data to initiate the one or more target products based on predefined product recognition criteria uniquely associated with the respective target products.

15 Claims, 7 Drawing Sheets

US 8,995,640 B2

CALL FORWARDING INITIATION SYSTEM AND METHOD

TECHNICAL FIELD

Example embodiments of the present application generally relate to data processing techniques. For example, the disclosure describes a technique for facilitating the initiation of call forwarding arrangements to a telephony device.

BACKGROUND

In telephone, call forwarding (also referred to as call diversion) is a feature on some telephone networks which lets an incoming call to a called party (having a telephone number corresponding to the number dialed by a caller) be redirected to a third party that has a telephone number different from the dialed number (referred to herein as a destination number).

Call forwarding lets a user set up automatic forwarding of incoming calls to a particular telephony device (occasionally described herein as the target of the call) to another telephony device (the "destination device"). Such call forwarding arrangements can be across national borders, so that an international traveler can, for example, arrange for automatic redirection of calls to, e.g., her US-based mobile phone to a telephone in another country, for example to a landline telephone in her Shanghai hotel room.

Setting up such call forwarding arrangements can sometimes be hampered by a user's unfamiliarity with particular codes or digits that need to be dialed together with the destination device's local number or subscriber number (such as exit codes, area codes, country codes, and/or private branch exchange (PBX) codes, or the like) in order for successful telephony connections to be established with the destination devices.

Consider that some systems allow calls within a local area to be made without dialing the local area code. For example, a phone number in North America will start with three numbers (such as 661), which is the area code, followed by seven digits split into sections of three and four (such as 550-1212), which may be one example of a local number consistent with this description. Most telephone networks are interconnected in the international telephone network, where the format of telephone numbers is standardized by the International Telecommunication Union Telecommunications Standardization Sector (ITU-T) in recommendation E.164. This specifies that the entire number should be 15 digits or shorter, and begin with a country prefix. For most countries, this is followed by an area code or city code and the subscriber number, which might consist of the code for a particular telephone exchange. ITU-T recommendation E.123 describes how to represent an international telephone number in writing or print, starting with a plus sign ("+") and the country code, but advertised telephone numbers do not always comply with this standard.

For example, international telephone numbers are often prefixed with the country code preceded by a "+", and with spaces in place of hyphens (e.g., "+XX YYY ZZZ ZZZZ"). This allows the reader to choose which access code (also known as International Dialing Digit) they need to dial from their location. However, it is often quoted together with the international access code which must precede it in the dial string, for example "011" in some countries (including Canada, Bermuda, and the United States): "011-XX-YYY-ZZZ-ZZZZ", or "00" in most European countries: "00-XX-YYY-ZZZ-ZZZZZZ". To complicate matters further, consider that in the Global System for Mobile Communications (GSM) networks, "+" is an actual character that may be used internally as the international access code, rather than simply being a convention.

These differing conventions and codes can cause user confusion, particularly for international travelers.

BRIEF DESCRIPTION OF THE DRAWINGS

Various features of the disclosure are illustrated by way of example, and not by way of limitation, in the figures of the accompanying drawings in which.

DETAILED DESCRIPTION

An example embodiment of the present disclosure describes data processing techniques that comprise automatically recognizing a telephone number in a digital picture, and initiating a call forwarding arrangement to a destination telephone device based on the recognized telephone number. The disclosure also describes data processing techniques that comprise determining the location of a mobile phone for which a core number for a destination telephone number (e.g., a local number or subscriber number) is entered, and automatically augmenting the entered core number to provide a destination telephone number that is effective for call forwarding initiation.

Figure 1:
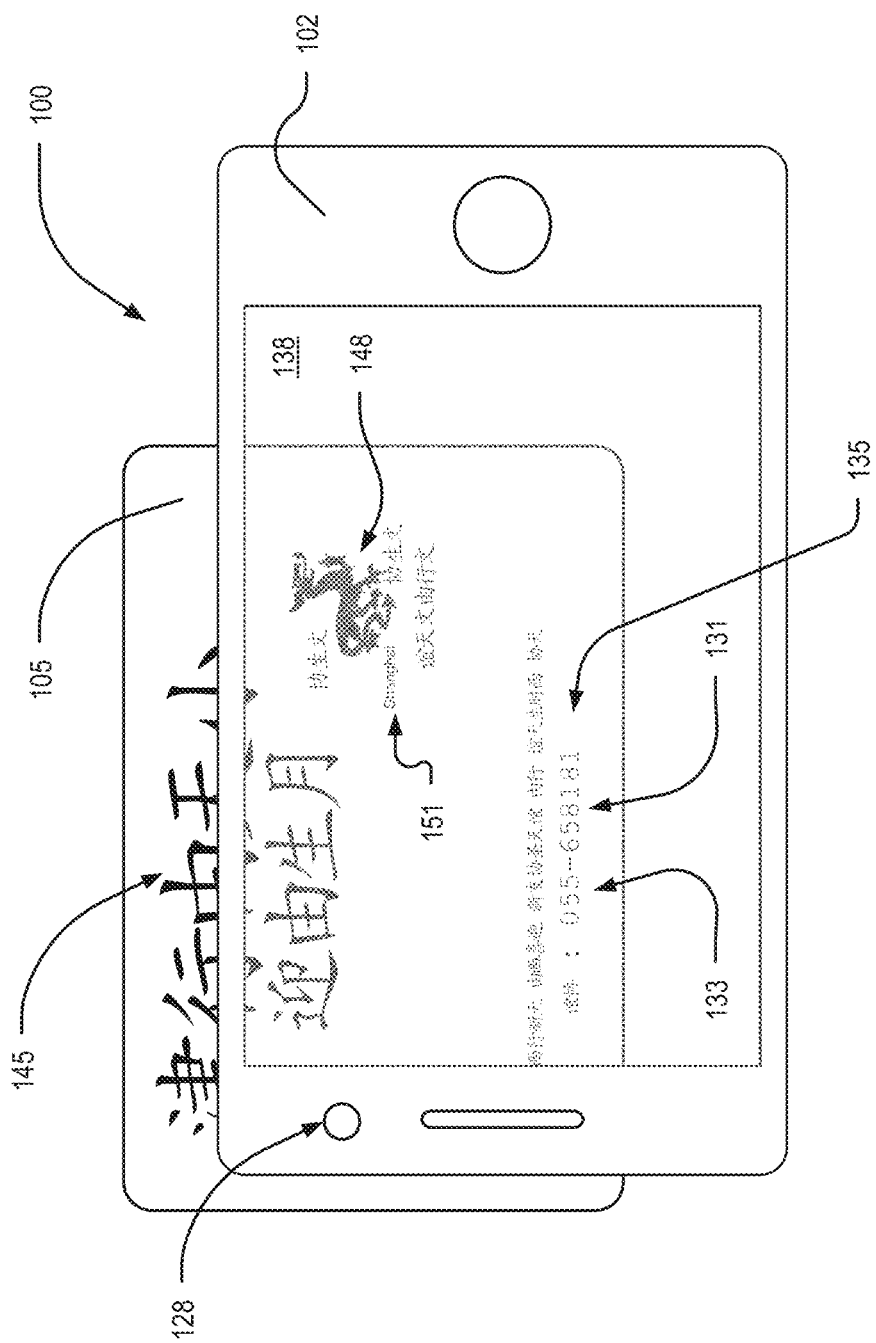
FIG. 1 is a schematic view illustrating an example of a mobile telephone device to provide automated call forwarding initiation in accordance with an example.

FIG. 1 is a schematic view of an example call forwarding initiation system 100 comprising a mobile telephone device in the example form of a mobile phone 102 having hardware and software components that enables it to facilitate the initiation of automated call forwarding arrangements.

In this example, a user wishes to initiate an automated call forwarding arrangement to automatically redirect telephone calls made to the mobile phone 102 to a room phone 213 (see FIG. 2) that comprises a landline telephone provided in a hotel room in which the user is staying. The mobile phone 102 is therefore a target telephone device for the call forwarding arrangement, while the room phone 213 is the destination telephone device.

The mobile phone 102 is supported by a US-based service provider 219 (see FIG. 2), so that calls received by the service provider 219 for the mobile phone 102 (after the desired goal forwarding arrangement has been initiated) are not connected to the mobile phone 102, but are instead redirected to the room phone 213. Because the service provider 219 and the room phone 213 are in different countries, an effective destination telephone number for establishing a telephonic connection between a switching office of the service provider system 219 in the United States and the room phone 213 must include applicable country and area codes for the room phone 213.

The user, however, may not have the applicable country and area codes readily at hand, but, in this example, has only a local telephone number 131 and area code 133 for the room phone 213, printed on a hotel key card 105.

To initiate the desired call forwarding arrangement, the user can launch a call forwarding initiating application 212 (see, e.g., FIG. 2) on the mobile phone 102, and may then, using for example an onboard camera 128 of the mobile phone 102, take a digital picture of an object on which at least part of the destination telephone number is presented. In this example, the user may take a digital picture of at least that part of the key card 105 on which the local number 131 and its associated area code 133 are printed.

Image data generated in taking the digital picture may then be processed by the mobile phone 102 to recognize the local number 131 that is present in the digital picture. The call forwarding initiating application 212 may be configured to present a recognized telephone number 135 (in this case consisting of the area code 133 and local telephone number 131) to the user for acceptance, e.g., on a screen 138 of the mobile phone 102.

After confirmation that the recognized telephone number 135 is the number to which calls are to be forwarded (i.e., that at least a correct core number for the destination number has been recognized) the call forwarding initiating application 212, executed on a processor 206 of the mobile phone 102, may then determine whether or not the recognized number 135 is an effective destination number for setting up the call forwarding arrangement, e.g., whether or not the recognized number 135 includes all the supplemental codes that is needed for successfully initiating the call forwarding arrangement.

In this example, the call forwarding initiating application 212 is configured to initiate call forwarding arrangements by dialing the service provider 219 using a predefined applicable vertical service code (VSC), followed by a validly formatted destination telephone number (referred to herein as an effective destination telephone number). A VSC is a special code dialed prior to (or instead of) a telephone number that engages some type of special telephone service or feature. Typically preceded with an asterisk, or * (star) key, and colloquially referred to as star codes, most are two or three digits in length.

US-based call forwarding arrangements are often initiated by dialing a VSC of *72, together with the destination telephone number. In other example embodiments, different VSCs or call forwarding initiation codes may be used.

If, however, the destination telephone number provided together with the VSC is improperly formatted (e.g., being described herein as a deficient telephone number), no working call forwarding arrangement will be established.

In this example, the call forwarding initiating application 212 determines that the recognized telephone number 135 is a deficient destination telephone number by establishing that it does not, e.g., include a country code.

The mobile phone 102 may then determine or estimate the geographical location of the destination telephone (e.g., the room phone 213) based on a current location of the mobile phone 102. Location information provided by an onboard positioning system 215 of the mobile phone 102 (e.g., a GPS system), may be accessed. In the example of FIG. 1, the system 100 establishes that the mobile phone 102 is currently in China, and may be configured to determine or estimate the geographical location of the destination telephone (e.g., the room phone 213) to close to that of the mobile phone 102 and therefore to be in the same country.

The mobile phone 102, through operation of the call forwarding initiating application 212, may then automatically supplement the recognized telephone number 135 with the country code for China. Note that the provision of a country code in this example is needed because the service provider 219 is US-based, so that telephonic connection of a US switching center to the room phone 213 may comprise an international call.

The mobile phone 102 may automatically determine whether or not a composite number formed by combination of the country code with the recognized telephone number 135 elicits further addition of an applicable access code or dialing characters. If so, the access code may be appended to a composite number, to form an effective destination telephone number.

Thereafter, the mobile phone 102 may automatically initiate the call forwarding arrangement by dialing the service provider 219 with the applicable VSC, followed by the composite effective destination telephone number.

In this example, to set up the call forwarding arrangement, the user needed merely to take the digital picture of the key card 105 on which the number 135 of the room phone 213 is printed in order for the call forwarding arrangement to be established, without concerning herself with the various applicable supplemental codes without which the desired call forwarding arrangement could not be initiated, but which were omitted from the information at hand.

Variations on the above-described example method are possible. For example, different methods may be used to estimate the location of the destination telephone (e.g., room phone 213), instead of (or in combination with) location information provided by the positioning system 215.

For example, the digital photograph provided by the mobile phone 102 may be processed to recognize one or more incidental location indicators or symbols. The mobile phone 102 may, e.g., recognize a known name or logo of a particular building or facility present in the digital picture. Turning again briefly to FIG. 1, a hotel name 145, logo 148, and city 151 may be included in the example key card 105 together with the telephone number 135 of room phone 213. In the drawings, these and other text elements are shown as being in non-western characters. Note that the text elements are for illustration purposes only and does not have real meaning.

In other examples, the image data may include more specific location indicators, such as, for example a room number. Responsive to identification of such the room number by, e.g., optical character recognition executed on the mobile phone 102, the effective destination telephone number communicated to the service provider 219 may be further augmented to include one or more PBX codes for provision to a PBX system of the hotel, to facilitate direct connection to the room phone 213.

Further examples of incidental or circumstantial location indicators that may be recognized in automated processes performed by execution of applications even on the mobile phone 102 or at an off-site server may include recognition of a particular language of printed material present in the image data captured by the mobile phone 102. With reference to FIG. 1 as an example, one or more of the application(s) 212 may be configured to recognize that the writing on the key card 105 is in Chinese. Language identification may also be based at least in part on linguistic and/or semantic analysis and subsequent to the initial character recognition.

In instances where other location information (such as GPS information) is unavailable or compromised, the approximation of the destination telephone number's location for code determination purposes may be based at least in part on mapping the identifying language to corresponding geographic regions and/or countries.

Selected Aspects of Example Embodiments

The above description comprises a particular example system and method, but various other embodiments or combinations of embodiments of the disclosed systems and methods may be realized. These include a method that comprises, in an automated operation using one or more processors, processing image data defining a digital picture, to recognize in the image data a telephone number; and based at least in part on the recognized telephone number, establishing an automated call forwarding arrangement to automatically redirect to a destination telephone device future calls made to a target telephone number, the destination telephone device corresponding to the recognized telephone number.

Such methods may be implemented by a system that comprises a number recognition module to process the image data in order to recognize the telephone number, and a call forwarding module to initiate the call forwarding arrangement based on the recognized telephone number.

The term "telephone number" here means a sequence of digits that comprises at least a core number to uniquely identify a particular telephony address or telephone device either within a particular area of a telephone network, or within the telephone network as a whole. The recognized telephone number may thus in some instances include (and may in other instances exclude) one or more supplemental digits, keystrokes, or codes (e.g., country codes, area codes, access codes, or PBX extensions) with which the core number (e.g., a local number or subscriber number) is in some cases to be combined to form an expanded telephone number that can successfully effect telephonic connection of a calling device to the destination telephone device, being referred to herein as an effective destination telephone number.

For example, the number of a telephone that is chosen as the destination telephone device may comprise a core number provided by its local number of 8765 4321. A telephone call originating in London may be made by merely dialing the local number (8765 4321), so that the local telephone number constitutes an effective telephone number for calls from a local London telephone. If dialing from another area or country, however, the local number may not suffice to establish connection with the destination telephone device, thus being a deficient telephone number. Instead the effective telephone number for the example destination telephone device for international calls may be +44 20 8765 4321, comprising the local number supplemented by a country code (+44) and an area code (20). Note that whether a particular number sequence (e.g., a particular local number) is an effective telephone number, or whether it is a deficient telephone number often depends not only on the number sequence, but may be dependent on the location of the calling device, and/or the location of the destination telephone device. Note further that, while the core number may be provided by a local landline number in some examples, it may in other instances be a unique subscriber number of a mobile telephone device, a unique device number of a Voice over Internet Protocol (VoIP), or the like.

The image data may be generated by capturing the digital picture or digital photograph by use of a camera device onboard a mobile telephone device which is uniquely associated with the target telephone number. In other words, the picture or photograph in which a representation of the telephone number to which calls are to be forwarded is present, is taken with the mobile telephone device from which the calls are to be forwarded.

The method may compromise the operation of determining that the recognized telephone number is deficient for initiating the call forwarding arrangement, responsive to which the recognized telephone number may be supplemented in an automated operation, to automatically compile an effective destination telephone number. The effective destination telephone number may thereafter be used in the initiating of the automated call forwarding arrangement, for example by automatically dialing the effective destination telephone number in combination with an applicable vertical service code to a service provider of the mobile telephone device.

The method may further comprise establishing, approximating, or estimating the destination telephone device's location, upon which automated determination of one or more supplemental codes applicable to the requested call forwarding arrangement may be based. The effective destination telephone number may be compiled by combining the one or more supplemental codes with the recognized telephone number.

The one or more supplemental codes may, for example, include a country code and/or an area code corresponding to the estimated location of the destination telephone device. The supplemental codes may instead, or in addition, include an extension code and/or PBX codes or protocols linked to a particular room in a building complex.

The location of the destination telephone device may be estimated based on a current location of the mobile telephone device. The method may therefore comprise determining the current location of the mobile telephone device, and proceeding on the estimation that the location of the destination telephone device is proximate the current location of the mobile telephone device. To this end, the system may process location information pro thus vided by a positioning system having one or more components onboard the mobile telephone.

The positioning system may comprise one or more components configured to determine spatial positioning or location of the mobile telephone device. For example, the positioning system may comprise a Global Positioning System (GPS) unit carried by the mobile telephone device. Instead, or in addition, the positioning system may include an indoor positioning system using, e.g., wireless signals such as WiFi, Bluetooth, or Near Field Communications (NFC) signals.

Instead, or in addition, the location of the destination telephone device may be estimated by processing the image data to recognize one or more incidental location indicators in the digital picture. The image data may in other words be processed to spot the visual clues as to the location of the destination telephone device. Note that determining the current location of the mobile telephone device with reference to a positioning system may be relatively precise, enabling accurate determination not only of the current country, city, area code, etc. in which the mobile telephone device is situated, but sometimes providing accurate longitudinal and latitude coordinates. Estimating the location of the destination telephone device (and/or the current location of the mobile telephone device) based on identification of incidental location indicators, in contrast, may serve broadly to identify a particular country, a particular area, a particular city, and/or a particular building in which the destination telephone device is located, depending on the nature and specificity of the relevant incidental location indicator.

The method may for example include processing the image data to recognize words that signify location, such as a country name, the city name, a hotel name, or the like. Instead, or in addition, the image data may be processed to recognize two-dimensional devices that indicate or imply a particular location, such as, for example a logo or trademark of a city, a country, a conference facility, a hotel, or the like.

In some embodiments, the incidental location may be provided not by specific words, characters, or symbols that point to a different location, but circumstantial evidence of the destination telephone device's location may instead be automatically identified in the image data. In one example embodiment, a language employed in association with the recognized telephone number may be automatically identified, to serve as incidental location indicators. In such cases, the method may comprise processing the image data to recognize a language of written material in the digital picture, and identifying a particular geographical region associated with the recognized language, the one or more supplemental codes corresponding to the particular geographical region.

As described earlier, the image data may be captured by a user by means of a portable electronic device on the person (e.g., the mobile phone, a tablet PC, or wearable electronics such as smart glasses with telephony, camera and display functionality, or the like).

In some embodiments, the processing of the image data to recognize at least a core telephone number may be performed at the mobile telephone device. Instead, or in addition, the image data may be communicated via a distributed network such as the Internet to a remote or off-site processor (e.g., an online server or a switching office of the telephone network service provider), at which the image data may be processed to recognize the telephone number. One or more of the associated automated processes, such as compiling an effective destination telephone number (which may or may not include automatically establishing the destination telephone device's location), may also be performed by processors or computers remote from the user's mobile telephone device.

It is a benefit of the example systems and methods that they facilitate the setting up of call forwarding arrangements by automated identification of at least part of the telephone number to which calls are to be forwarded. Thus, instead of having to key in a sequence of digits that make up the local number of the destination telephone, a user can merely use her mobile phone to take a photo of an object or document on which the telephone number is represented. Such input by optical character recognition can reduce or avoid user frustration that may be caused by incorrectly transferring the destination telephone number to the phone via, e.g., a phone touch screen or keypad, particularly bearing in mind that foreign travelers often have to set up such call forwarding arrangements at the end of a long trip, and in a foreign environment.

Further benefits may be provided by automated augmentation of the recognized telephone number to form an effective destination telephone number, for example by removing the onus of establishing localized number format conventions and/or the applicable supplemental codes from the user.

The setting up of call forwarding to a particular telephone address is thus significantly simplified from the user's perspective. Some embodiments may, for example, provide one touch call forwarding in which the user need merely (after, for example, launching an associated mobile phone app) press, e.g., a confirm or send button on the mobile phone to effect the establishment of the desired call forwarding arrangement. In such cases, operations of recognizing the destination telephone number, of establishing the relevant supplemental code(s) (which may include determining or automatically deducing the geographical location of the destination telephone device), and/or of communicating with the telephone service provider being performed in the background, are invisible to the user.

In other embodiments or instances, the user may be requested via a user interface on the mobile phone to confirm one or more automatically determined/approximated facts, or to request input by the user of needed information that could not be determined or approximated based on the available information.

In yet further embodiments, the method may comprise capturing an image of, for example, a pre-paid phone card or voucher. Such image data may be processed to recognize a telephone number associated with the pre-paid airtime or voucher, responsive to which the relevant phone function may be executed to update the phone with which the image was captured with the corresponding airtime.

Some aspects thus describe processing a digital image captured by a telephone device to recognize a telephone number therein, and, responsive to recognizing the telephone number, performing an automated telephone service function (such as setting up call forwarding or loading airtime to the phone) with respect to the telephone device with which the image was captured.

Example System

More specific examples of system elements and components by which the disclosed methods may be implemented will now be described. Note that the systems and system components described below serve to provide various functionalities mentioned both in the following description and elsewhere in this disclosure, and that, for clarity of description, the functionalities of the system components are not in all instances explicitly reiterated in the following description of the system components and elements.

For ease of reference, different environments of a particular system element may be indicated by identical reference numerals in different figures, so that an element indicated by the same reference numeral is not necessarily identical in all respects.

Figure 2:
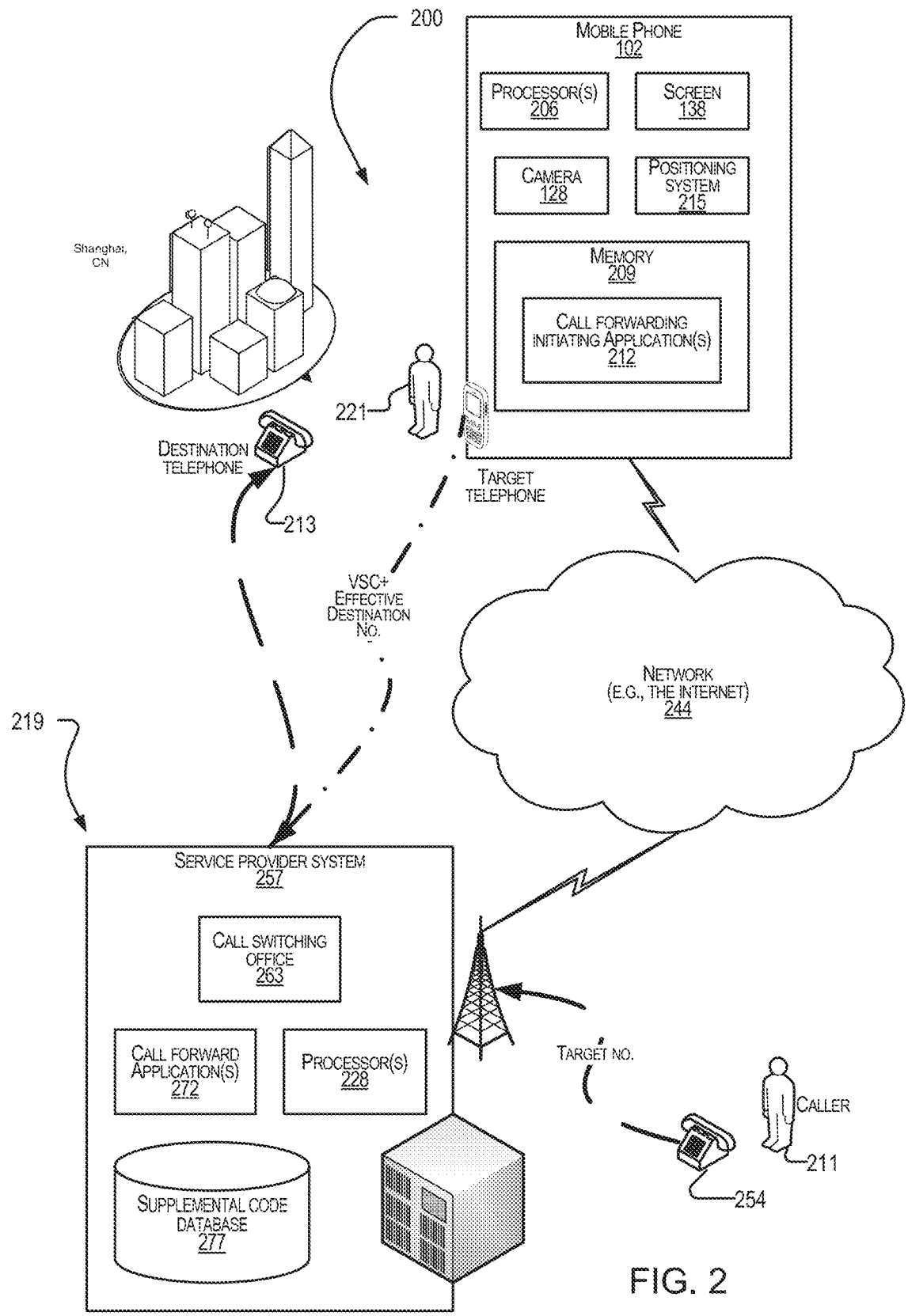
FIG. 2 is a schematic block diagram of a call forwarding initiation system, according to an example embodiment.

FIG. 2 is a block diagram depicting an example embodiment of a system 200 for automated set up of call forwarding. The example system 200 includes a portable electronic device in the example form of the earlier described mobile phone 102 of an example user. The mobile phone 102 may include a processor 206 coupled to one or more memories 209 on which one or more applications are stored for execution by the processor 206. The applications may include one or more call forwarding initiating applications 212 that comprise instructions that enable the mobile phone 102 to perform the respective processes and/or operations disclosed herein, when the instructions are executed by the processor 206. The mobile phone 102 further comprises a built-in camera 128 to capture image information, e.g., digital video and/or digital photographs. The mobile phone 102 also has a display screen 138.

Figure 3:
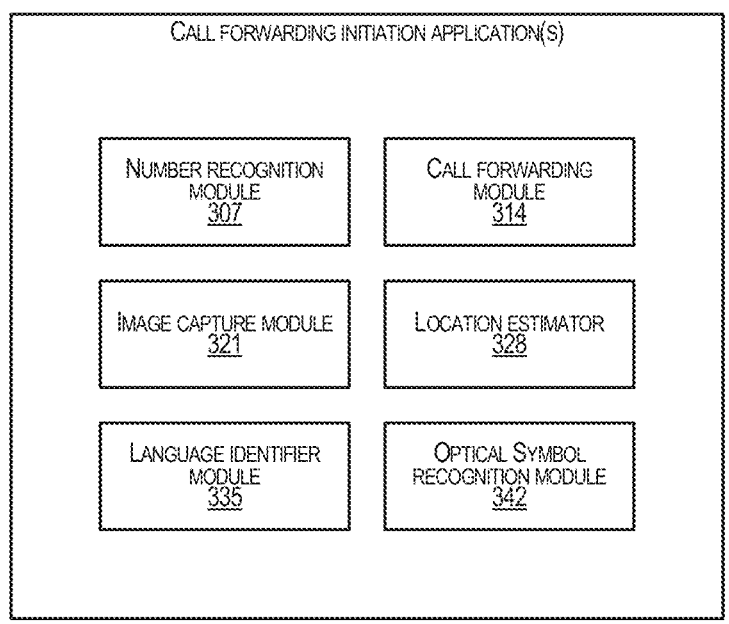
FIG. 3 is a schematic block diagram of one or more call forwarding initiation application(s), in accordance with an example embodiment, that may be configured for execution on a mobile phone and/or on a remote processor.

FIG. 3 is a block diagram schematically showing various example modules provided by the call forwarding initiation application(s) 212 for implementing the disclosed method operations.

A image capture module 321 may be provided to facilitate the capturing of image data at the mobile phone 102. A number recognition module 307 may be provided to process image data defining a digital picture captured, for example, by the mobile phone 102, to recognize a telephone number therein. Call forwarding initiation application(s) 212 may further comprise a call forwarding module 314 to initiate a call forwarding arrangement based at least in part on the recognized telephone number 135. With reference to FIG. 2, an example call forwarding arrangement is shown in which calls to the mobile phone 102 (being the target telephone of the call forwarding arrangement) are automatically redirected by a call switching office 263 of a service provider system 257 of the user 221's service provider 219 to the destination telephone in the example form of the user 221's hotel room phone 213.

Thus, when a caller 211 makes a telephone call with the mobile phone 102 as target (i.e., by typing in the user's 221 regular subscriber number) a calling telephone 254 from which the call is made is connected by the service provider system 257 not to the mobile phone 102, but to the room phone 213. This call forwarding arrangement is indicated in FIG. 2 by broken-line arrows.

To initiate this call forwarding setup, the call forwarding module 314 dials the call forwarding vertical service code (VSC) together with an effective destination telephone number for the destination telephone (e.g., room phone 213) to the service provider system 257, as indicated by chain-dotted arrows in FIG. 2.

The call forwarding module 314 may also be configured to supplement the recognized telephone number 135, if desired, in order to form an effective destination telephone number for establishing the call forwarding arrangement. Such supplementation may be performed with reference to a supplemental code database that may be maintained in the memory 209 of the mobile phone 102, or may be accessed from an online site. In this example embodiment, the service provider system 257 may provide such online support (e.g., by means of a network architecture such as that illustrated in FIG. 4) by hosting a user-application accessible supplemental code database 277.

The call forwarding initiation application(s) 212 may also include a location estimator 328 that is configured to determine or estimate a geographic location of the destination telephone (e.g., room phone 213), to facilitate determination of the appropriate supplemental codes. The location estimator 328 may cooperate with an optical symbol recognition module 342 configured, for example, to identify particular languages by recognizing associated characters in written material included in the image data. A language identifier module 335 may further be provided to perform linguistic and/or semantic analysis of written material recognized by the optical symbol recognition module 342, further to provide information on which automated location estimation may be based.

As mentioned before, one or more of the data processing operations described above as being performed by the mobile phone 102 may instead, or in addition, be performed by the service provider system 257, or another off-site processor. To this end, the service provider system 257 in this example includes one or more processor(s) 228 to execute call forward application(s) 272 similar or analogous to those described in the example call forwarding initiating application(s) 212 installed on the mobile phone 102.

Thus, in some examples, the mobile phone 102 may transmit the image data to the service provider system 257 together with an instruction that a call forwarding arrangement is to be initiated for the telephone number 135 in the image. It will be appreciated that any combination of the sharing of processing load between the mobile phone 102 and a centralized processor may be envisaged.

The service provider system 257 may be connected to a customer-accessible data network 244, such as the Internet, through which data transfer with the mobile phone 102 may be done. In other embodiments, at least some of the data processing operations may be provided by a web service. One example embodiment of such a platform architecture is described with reference to FIG. 4.

Example Platform Architecture

Figure 4:
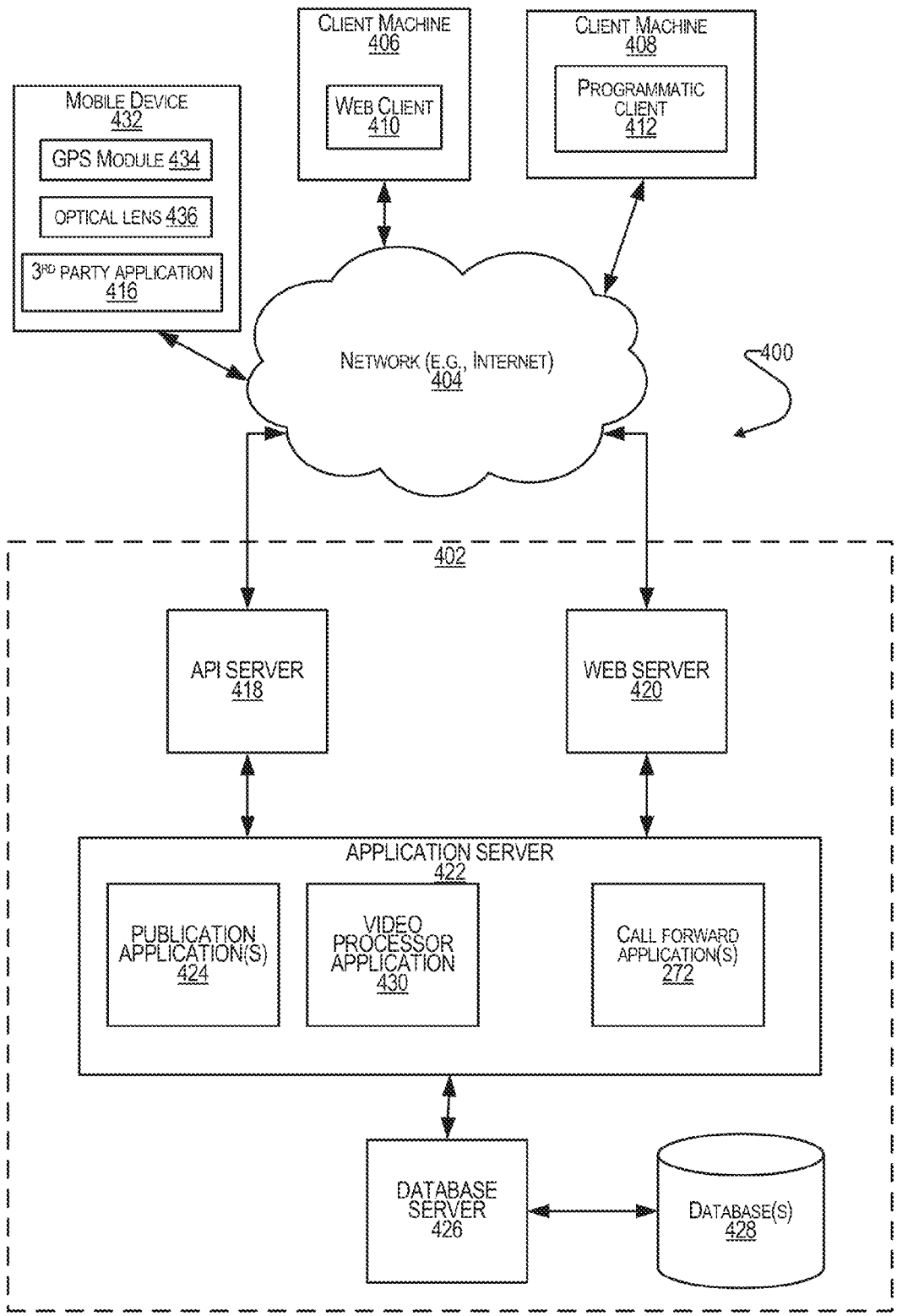
FIG. 4 is a schematic network diagram depicting a network system, according to one embodiment, having a client-server architecture configured for exchanging data over a network.

FIG. 4 is a network diagram depicting a network system 400, according to one embodiment, having a client-server architecture configured for exchanging data over a network. For example, the network system 400 may be a call forwarding support system where clients may communicate and exchange data within the network system 400. Although illustrated herein as a client-server architecture as an example, other embodiments may include other network architectures, such as a peer-to-peer or distributed network environment.

A data exchange platform, in an example form of a network-based call forwarding support system 402, may provide server-side functionality, via a network 404 (e.g., the Internet) to one or more clients. The one or more clients may include users that utilize the network system 400 and more specifically, the call forwarding support system 402, to exchange data over the network 404. These transactions may include transmitting, receiving (communicating) and processing data to, from, and regarding content and users of the network system 400. The data may include, but are not limited to, content and user data images, GPS information, and user profiles, among other things.

In various embodiments, the data exchanges within the network system 400 may be dependent upon user-selected functions available through one or more client or user interfaces (UIs). The UIs may be associated with a client machine, such as a client machine 406 using a web client 410. The web client 410 may be in communication with the support system 402 via a web server 420. The UIs may also be associated with a client machine 408 using a programmatic client 412, such as a client application, or a mobile device 432 hosting a third party application 416. It can be appreciated in various embodiments the client machine 406, 408, or third mobile device 432 may be associated with a buyer, a seller, a third party electronic commerce platform, a payment service provider, or a shipping service provider, each in communication with the support system 402 and optionally each other. The buyers and sellers may be any one of individuals, merchants, or service providers, among other things.

The mobile device 432 may also be in communication with the support system 402 via the web server 420. The mobile device 432 may include a portable electronic device providing at least some of the functionalities of the client machines 406 and 408. The mobile device 432 may include a third party application 416 (or a web client) configured communicate with application server 422. In one embodiment, the mobile device 432 includes a GPS module 434 and an optical lens 436. The GPS module 434 is configured to determine a location of the mobile device 432. The optical lens 436 enables the mobile device 432 to take pictures and videos.

Turning specifically to the support system 402, an application program interface (API) server 418 and a web server 420 are coupled to, and provide programmatic and web interfaces respectively to, one or more application servers 422. The application servers 422 host one or more application(s), in this example being the call forward application(s) 272 described with reference to FIGS. 2 and 3. The application servers 422 are, in turn, shown to be coupled to one or more database server(s) 426 that facilitate access to one or more database(s) 428. The API server 418 may send and receive data to and from an application (e.g., programmatic client 412 or third party application 416) running on another client machine (e.g., client machine 408 or third party server 414).

FIG. 4 a third party application may furthermore execute on a 3rd party server, and may have programmatic access to the support system 402 via the programmatic interface provided by the API server 418. For example, the third party application 416 may use information retrieved from the support system 402 to support one or more features or functions on a website hosted by the third party.

Example Mobile Device

Figure 5:
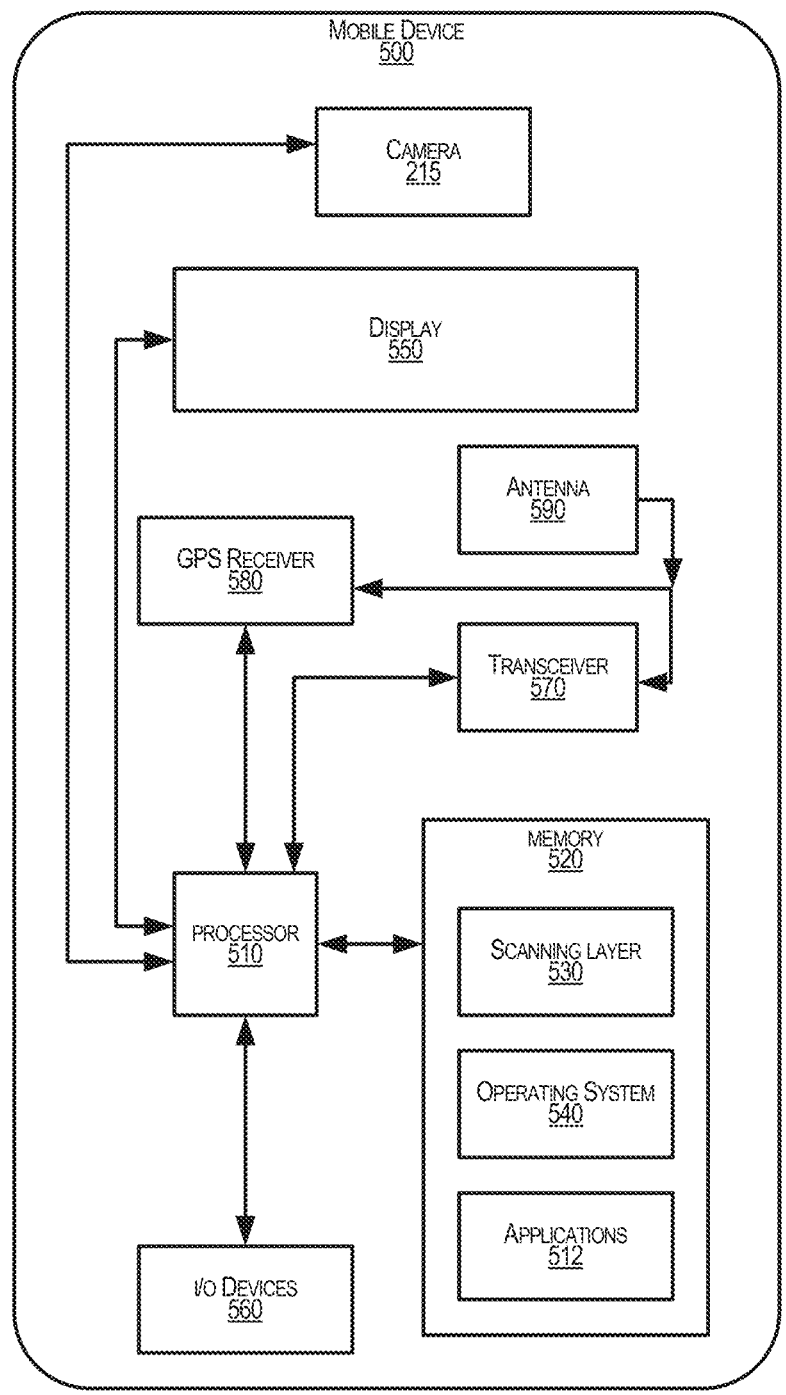
FIG. 5 is a schematic block diagram of a mobile device configured to provide call forwarding initiation, according to another example embodiment.

FIG. 5 is a block diagram illustrating a further example embodiment of a mobile device 500 that may be employed to provide the functionalities described, e.g., with reference to a mobile phone 102 (see FIGS. 1 and 2). according to an example embodiment. The mobile device 500 may include a processor 510. The processor 510 may be any of a variety of different types of commercially available processors suitable for mobile devices (for example, an XScale architecture microprocessor, a Microprocessor without Interlocked Pipeline Stages (MIPS) architecture processor, or another type of processor). A memory 520, such as a Random Access Memory (RAM), a Flash memory, or other type of memory, is typically accessible to the processor 510. The memory 520 may be adapted to store an operating system (OS) 540, as well as application programs 512 (among which may be included the above-discussed in-store call forwarding initiation application(s) 212), and a location enabled application that may provide LBSs to a shopper. A scanning device 530 may be provided for scanning visual codes. The processor 510 may be coupled, either directly or via appropriate intermediary hardware, to a display 550 and to one or more input/output (I/O) devices 560, such as a keypad, a touch panel sensor, a microphone, and the like. Similarly, in some embodiments, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 500. Further, in some configurations, a GPS receiver 580 may also make use of the antenna 590 to receive GPS signals.

Example Methods

Figure 6:
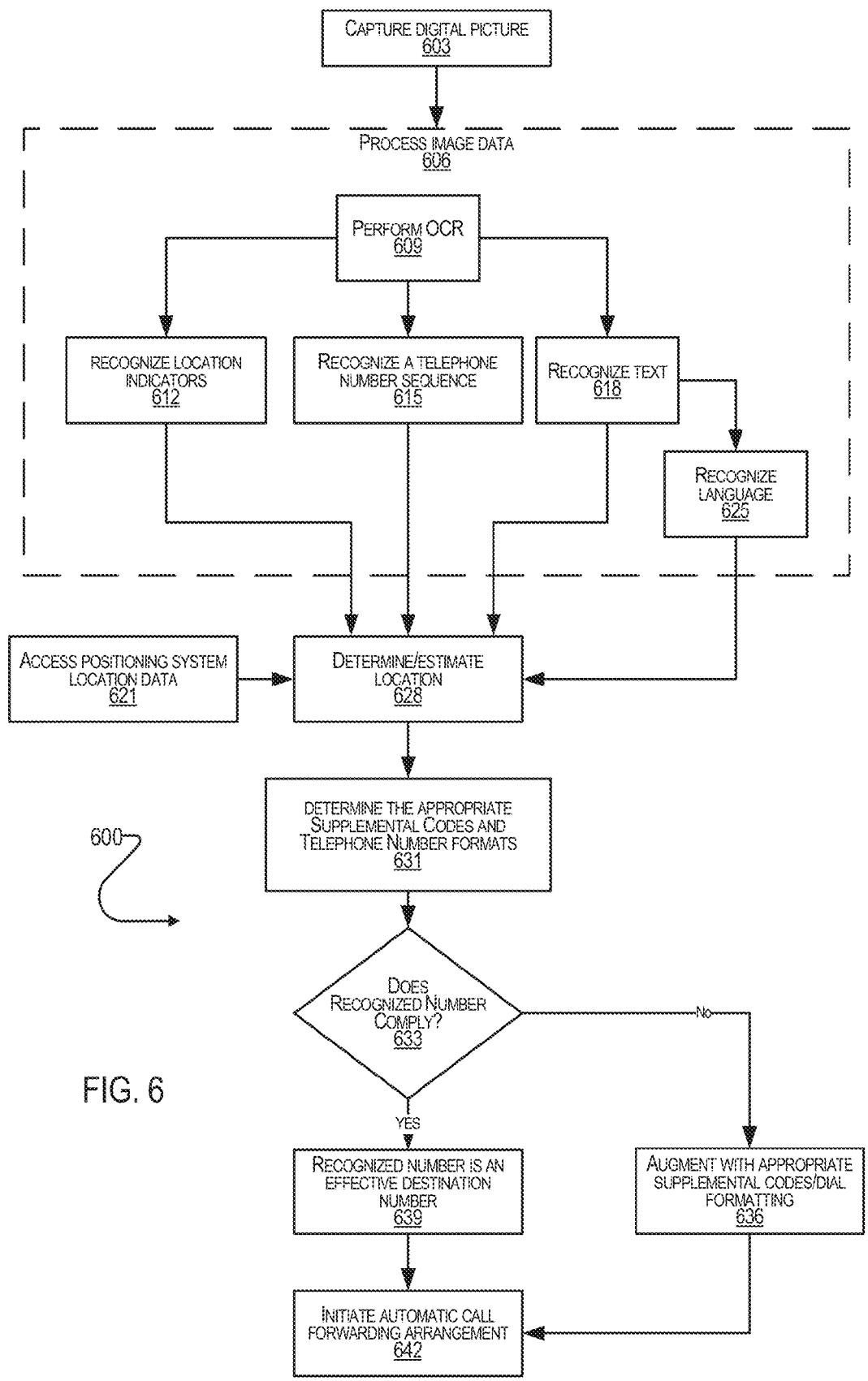
FIG. 6 is a flow diagram of an example method for call forwarding initiation.

FIG. 6 is a schematic flow chart that illustrates an example method 600 for call forwarding initiation. For clarity of description, like reference numerals indicate like elements in FIGS. 1-4, and in FIG. 6.

The method 600 may comprise capturing a digital picture, at operation 603, of an object on which a representation of a desired number to which calls are to be forwarded is printed.

Image data that represent the digital picture is processed, at operation 606, for example by performing optical character recognition, at operation 609. In this example, the data processing is performed entirely on the mobile phone 102 using the respective modules described in FIG. 3.

The processing may comprise recognizing a sequence of digits that form a telephone number, at operation 615, recognizing text in the image, at operation 618, and recognizing location indicators that are captured in the image together with the telephone number, at operation 612. The recognized text may also be processed to recognize a particular language of written material in the image, at operation 625.

Positioning system location data may be accessed, at operation 621, for example from the mobile phone 102's onboard GPS, and the current geographic location of the mobile phone 102 may be determined, at operation 628. In instances where GPS location data is received, the current location may be determined based exclusively thereon. If however, no such location is available, the recognized circumstantial or incidental location indicators, including symbols, logos, address elements, recognized text, a particular recognized language, and the like may be used, at operation 628, to estimate the current location of the mobile phone 102, as described earlier.

The mobile phone 102 may then use the current location to determine, at operation 631, appropriate prescribed supplemental codes and/or dial formatting that are to form part of an effective destination telephone number.

If it is determined, at operation 633, that the recognized telephone number complies, then it is determined, at operation 639, that the recognized number is an effective destination number, and is used, as recognized, to initiate the automatic call forwarding arrangement, at operation 642, by dialing the recognized number to the service provider 219 in combination with the applicable call forwarding codes.

If, however, it is determined at operation 633 that the recognized telephone number does not have the appropriate supplemental codes (e.g., omitting an area code and/or a country code where it is relevant), it is determined that the recognized telephone number is not an effective destination telephone number. The recognized telephone number may then automatically be augmented, at operation 636, by supplementing it with the appropriate codes and formatting correctly. Thereafter, the augmented telephone number is used, at operation 642, to initiate the call forwarding arrangement.

Components, and Logic of Example Embodiments

Certain embodiments are described herein as including logic or a number of components, modules, or mechanisms. Modules may constitute either software modules, with code embodied on a non-transitory machine-readable medium (i.e., such as any conventional storage device, such as volatile or non-volatile memory, disk drives or solid state storage devices (SSDs), etc.), or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry or in temporarily configured circuitry (e.g., configured by software), may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs)).

Figure 7:
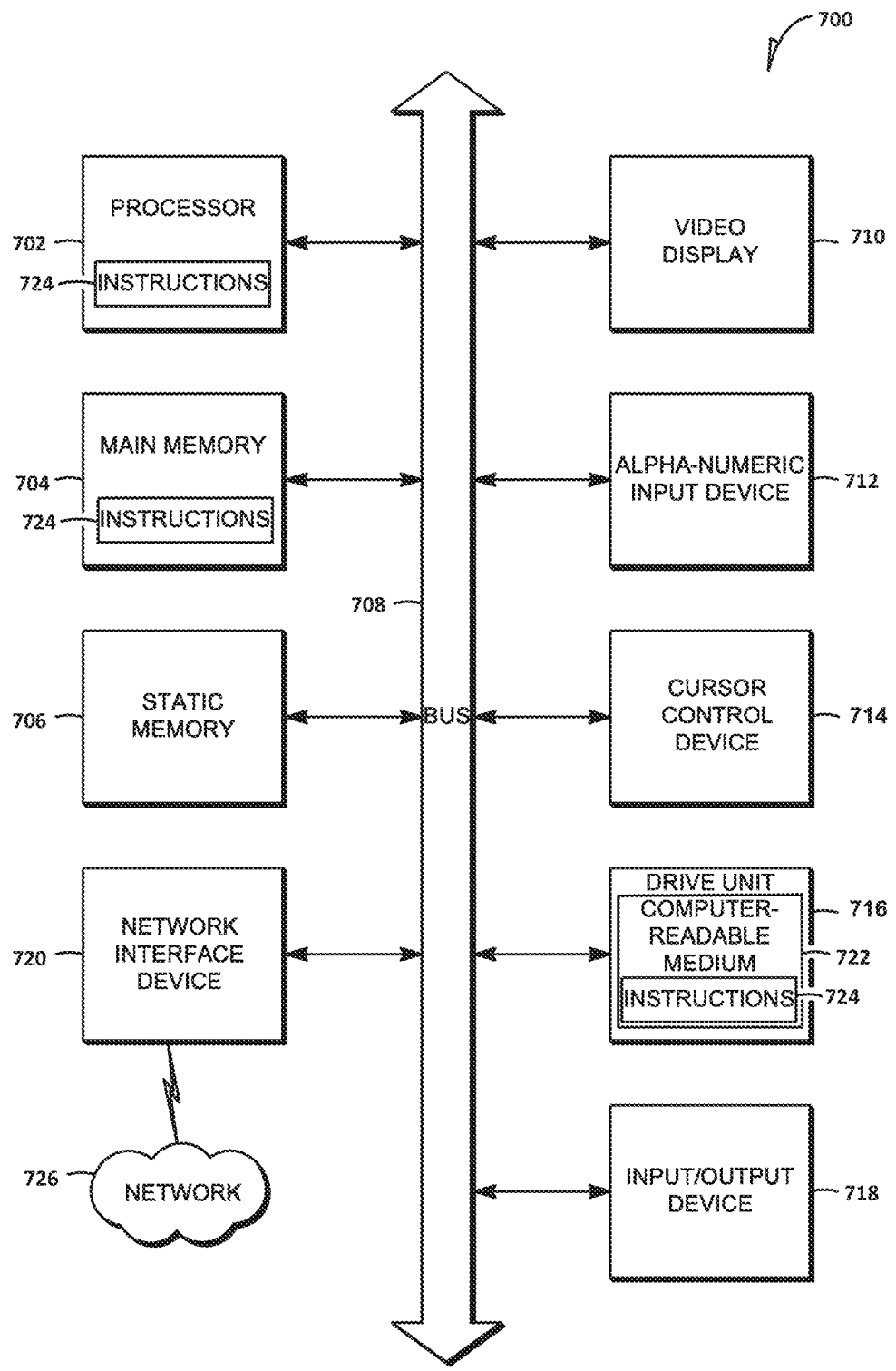
FIG. 7 shows a diagrammatic representation of machine in the example form of a computer system within which a set of instructions may be executed to cause the machine to perform any one or more of the methodologies discussed herein.

FIG. 7 shows a diagrammatic representation of a machine in the example form of a computer system 700 within which a set of instructions 724 may be executed for causing the machine to perform any one or more of the methodologies discussed herein. For example, the system 100 (FIG. 1) or any one or more of its components (FIGS. 1 and 2) may be provided by the system 700.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a cursor control device 714 (e.g., a mouse), a disk drive unit 716, an audio/video signal input/output device 718 (e.g., a microphone/speaker) and a network interface device 720.

The disk drive unit 716 includes a machine-readable storage medium 722 on which is stored one or more sets of instructions 724 (e.g., software) embodying any one or more of the methodologies or functions described herein. The instructions 724 may also reside, completely or at least partially, within the main memory 704 and/or within the processor 702 during execution thereof by the computer system 700, the main memory 704 and the processor 702 also constituting non-transitory machine-readable media.

The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database and/or associated caches and servers) that store the one or more sets of instructions 724. The term "machine-readable medium" shall also be taken to include any medium that is capable of storing a set of instructions (e.g., instructions 724) for execution by the machine and that cause the machine to perform any one or more of the methodologies of this disclosure. The term "machine-readable medium" shall accordingly be taken to include, but not be limited to, solid-state memory devices of all types, as well as optical and magnetic media.

Thus, systems and methods for in-store product detection are disclosed. Although these methods and systems have been described with reference to specific example embodiments, it will be evident that various modifications and changes may be made to these embodiments without departing from the broader spirit and scope thereof. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the disclosed subject matter lies in less than all features of a single disclosed embodiment. Thus, the following claims are hereby incorporated into the Detailed Description, with each claim standing on its own as a separate embodiment.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

What is claimed is:

1. A system comprising:
a number recognition module to process image data defining a digital picture captured with an onboard camera of a mobile telephone device and including a visual representation of a telephone number, to recognize the telephone number based on the visual representation thereof in the digital picture;
a location estimator configured to estimate a location of a destination telephone device that corresponds to the recognized telephone number; and
a call forwarding module configured to:
determine that the recognized telephone number is deficient for initiating an automated call forwarding arrangement;
determine, based on the estimated location of the destination telephone device, one or more supplemental codes applicable to the automated call forwarding arrangement;
compile an effective destination telephone number by combining the one or more supplemental codes with the recognized telephone number; and
initiate, based at least in part on the effective destination telephone number, the automated call forwarding arrangement to automatically redirect to the destination telephone device future calls made to the mobile telephone device.

2. The system of claim 1, wherein the one or more supplemental codes include a country code corresponding to the estimated location of the destination telephone device.

3. The system of claim 1, wherein the one or more supplemental codes include an area code corresponding to the estimated location of the destination telephone device.

4. The system of claim 1, wherein the location estimator is configured to estimate the location of the destination telephone device based on location information provided by a positioning system onboard the mobile telephone device.

5. The system of claim 1, further comprising an optical symbol recognition module to recognize one or more incidental location indicators in the digital picture, the location estimator being configured to estimate the location based on the one or more recognized incidental location indicators.

6. The system of claim 5, further comprising a language identifier module to recognize a language of written material in the digital picture, the location estimator being configured to identify a particular geographical region associated with the recognized language.

7. A method comprising:
in an automated operation using one or more processors, processing image data defining a digital picture captured with an onboard camera of a mobile telephone device and including a visual representation of a telephone number, to recognize the telephone number based on the visual representation thereof in the digital picture;
estimating a location of a destination telephone device that corresponds to the recognized telephone number;
determining that the recognized telephone number is deficient for initiating an automated call forwarding arrangement;
determining, based on the estimated location of the destination telephone device, one or more supplemental codes applicable to the automated call forwarding arrangement;
compiling an effective destination telephone number by combining the one or more supplemental codes with the recognized telephone number; and
based at least in part on the effective destination telephone number, establishing the automated call forwarding arrangement to automatically redirect to the destination telephone device future calls made to the mobile telephone device.

8. The method of claim 7, wherein the one or more supplemental codes include a country code corresponding to the estimated location of the destination telephone device.

9. The method of claim 7, wherein the one or more supplemental codes include an area code corresponding to the estimated location of the destination telephone device.

10. The method of claim 7, wherein the one or more supplemental codes include an extension code linked to a particular room in a building complex.

11. The method of claim 7, wherein the estimating of the location of the destination telephone device is based on location information provided by a positioning system onboard the mobile telephone device.

12. The method of claim 7, wherein the estimating of the location of the destination telephone device comprises processing the image data to recognize one or more incidental location indicators in the digital picture.

13. The method of claim 12, wherein the one or more incidental location indicators comprise words that signify location.

14. The method of claim 7, wherein the estimating of the location of the destination telephone device comprises:

processing the image data to recognize a language of written material in the digital picture; and identifying a particular geographical region associated with the recognized language, the one or more supplemental codes corresponding to the particular geographical region.

15. A non-transitory machine-readable storage medium storing instructions for causing a machine, in response to execution of the instructions by the machine, to perform operations comprising:

processing image data defining a digital picture captured with an onboard camera of a mobile telephone device and including a visual representation of a telephone number, to recognize the telephone number based on the visual representation thereof in the digital picture;

estimating a location of a destination telephone device that corresponds to the recognized telephone number;

determining that the recognized telephone number is deficient for initiating an automated call forwarding arrangement;

determining, based on the estimated location of the destination telephone device, one or more supplemental codes applicable to the automated call forwarding arrangement;

compiling an effective destination telephone number by combining the one or more supplemental codes with the recognized telephone number; and based at least in part on the effective destination telephone number, initiating automated call forwarding arrangement to automatically redirect to the destination telephone device future calls made to the mobile telephone device.

* * * * *

UNITED STATES PATENT AND TRADEMARK OFFICE
CERTIFICATE OF CORRECTION

PATENT NO. : 8,995,640 B2
APPLICATION NO. : 13/706899
DATED : March 31, 2015
INVENTOR(S) : Matthew Scott Zises Page 1 of 1

It is certified that error appears in the above-identified patent and that said Letters Patent is hereby corrected as shown below:

In the claims

In column 18, line 14, in Claim 15, after "initiating", insert --the--, therefor Signed and Sealed this
Seventeenth Day of November, 2015

Michelle K. Lee
*Director of the United States Patent and Trademark Office*